United States Patent
Bryant et al.

(10) Patent No.: US 8,226,484 B2
(45) Date of Patent: Jul. 24, 2012

(54) SIMULATED HANDLEBAR TWIST-GRIP CONTROL OF A SIMULATED VEHICLE USING A HAND-HELD INERTIAL SENSING REMOTE CONTROLLER

(75) Inventors: Jonathan Bryant, Bellevue, WA (US); Yoonjoon Lee, Redmond, WA (US); Richard Vorodi, Redmond, WA (US)

(73) Assignee: Nintendo of America Inc., Redmond, WA (US)

( * ) Notice: Subject to any disclaimer, the term of this patent is extended or adjusted under 35 U.S.C. 154(b) by 289 days.

(21) Appl. No.: 12/606,738

(22) Filed: Oct. 27, 2009

(65) Prior Publication Data

US 2011/0053691 A1    Mar. 3, 2011

Related U.S. Application Data

(60) Provisional application No. 61/237,332, filed on Aug. 27, 2009.

(51) Int. Cl.
*A63F 9/24* (2006.01)
(52) U.S. Cl. ............... 463/39; 463/36; 463/37; 463/38
(58) Field of Classification Search ............... 463/36–39
See application file for complete search history.

(56) References Cited

U.S. PATENT DOCUMENTS

| | | | |
|---|---|---|---|
| 5,044,956 A * | 9/1991 | Behensky et al. | 434/45 |
| 5,364,271 A | 11/1994 | Aknin et al. | |
| 6,251,015 B1 * | 6/2001 | Caprai | 463/36 |
| 6,276,230 B1 | 8/2001 | Crum et al. | |
| 6,978,694 B2 | 12/2005 | Peppard | |
| 7,112,107 B1 * | 9/2006 | Torgerud | 440/2 |
| 7,424,388 B2 | 9/2008 | Sato | |
| 2002/0055422 A1 * | 5/2002 | Airmet et al. | 482/61 |
| 2007/0060228 A1 | 3/2007 | Akasaka et al. | |
| 2007/0060391 A1 | 3/2007 | Ikeda et al. | |
| 2007/0066394 A1 | 3/2007 | Ikeda et al. | |
| 2007/0072674 A1 | 3/2007 | Ohta et al. | |
| 2007/0281828 A1 * | 12/2007 | Rice | 482/4 |
| 2007/0298893 A1 * | 12/2007 | Yu et al. | 472/133 |
| 2008/0125224 A1 | 5/2008 | Pollatsek | |
| 2009/0191967 A1 * | 7/2009 | Konishi et al. | 463/37 |
| 2009/0286654 A1 * | 11/2009 | Rice | 482/4 |

OTHER PUBLICATIONS

Racing game—Wikipedia, the free encyclopedia, http://en.wikipedia.org/wiki/Racing_game (last modifed Jul. 6, 2009).
Thrustmaster, FreeStyler Bike, Instruction Manual (2001).

(Continued)

*Primary Examiner* — Peter DungBa Vo
*Assistant Examiner* — Steve Rowland
(74) *Attorney, Agent, or Firm* — Nixon & Vanderhye P.C.

(57) ABSTRACT

A hand-held Wii remote controller for a video game system is adapted to simulating motion control for a motorcycle, jet skis, or other vehicle steered by handlebars. The player holds the remote horizontally with one hand on each end, parallel to a TV display screen, and can control simulated motorcycle operations using inertial sensing. For example, rotating the handheld remote about its orthogonal X/Y/Z axes as pitch (throttle accelerate/decelerate), yaw (steering left/right), and roll (leaning left/right into a turn) can be used as control inputs. In addition, the player can emulate a more aggressive, real-world lean into turns by rocking side-to-side on an optional balance board.

9 Claims, 11 Drawing Sheets

OTHER PUBLICATIONS

Julian Solos @ http://www.physicsfor7ms.com/showthread.php?t=13060, "Motorcycle: Lean Angle, Speed, and Turn Radius" (Jan. 22, 2004).

Wii Balance Board: How it was developed, Excerpts from 4 articles on 1 interview @ Nintendo website:: http://us.wii.com/wii-fit/iwata asks/vol2 page 1.jsp (2007).

F. Bellotti, et al., "Enhancing the Educational Value of Video Games," ACM Computers in Entertainment, vol. 7, No. 2, Articls 23 (Publication date: Jun. 2009).

Mario Enriquez, et al., "A Pneumatic Tactile Alerting System for the Driving Environment," ACM Proceedings of the 2001 workshop on perceptive user interfaces, Orlando, FL, Copyright 2001 ACM (2001).

Shaun White Snowboarding Road Trip for Wii, Instruction Booklet, UBISOFT (2008).

Excite Truct for Wii, Instruction Booklet, Nintendo, Monster Games (2006).

\* cited by examiner

NON-LIMITING
EXAMPLE GAME PLAY

NON-LIMITING EXAMPLE GAME PLAY

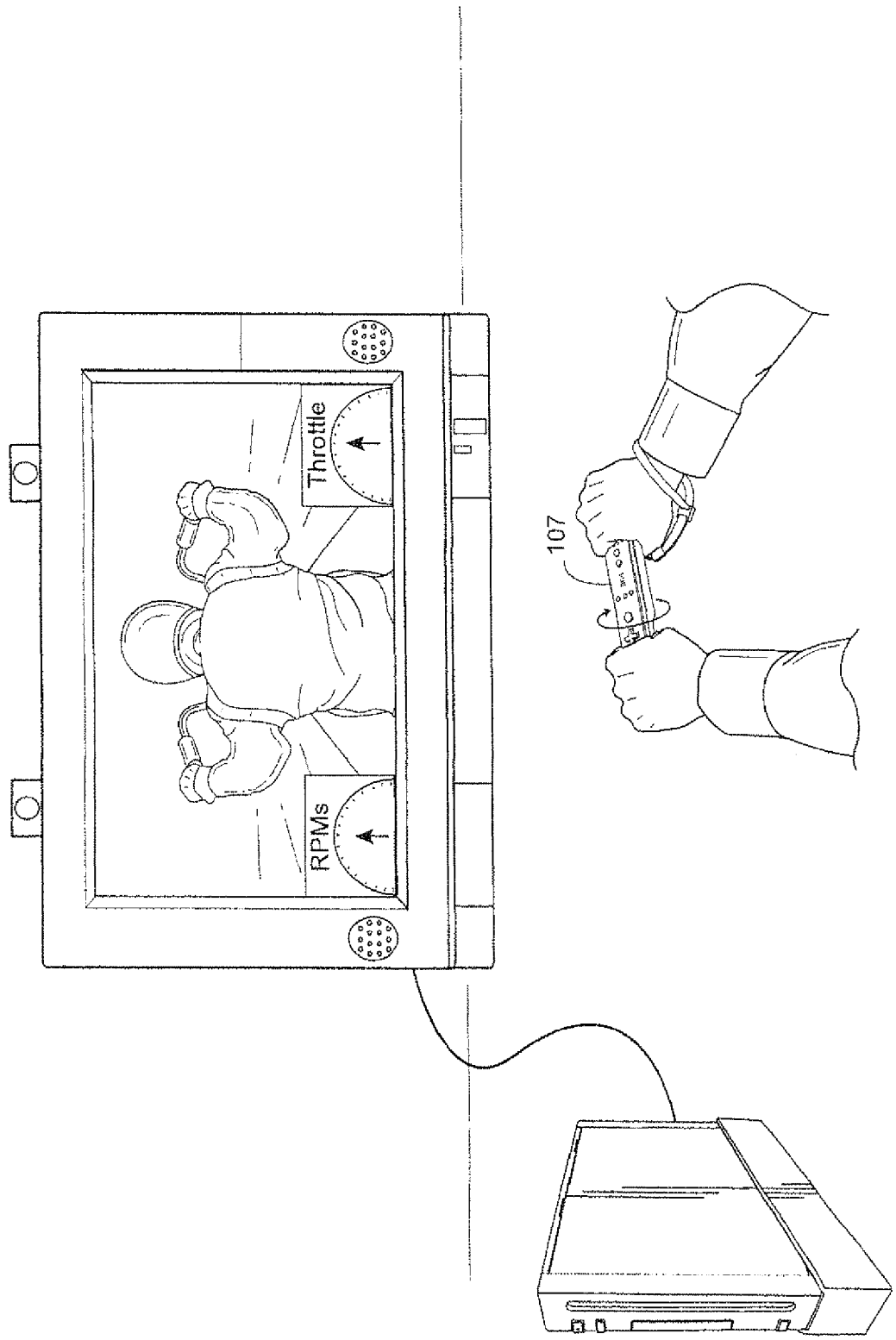

NO PITCH
(OR "NEUTRAL")

PITCH UP
(CCW ROTATION)

PITCH DOWN
(CW ROTATION)

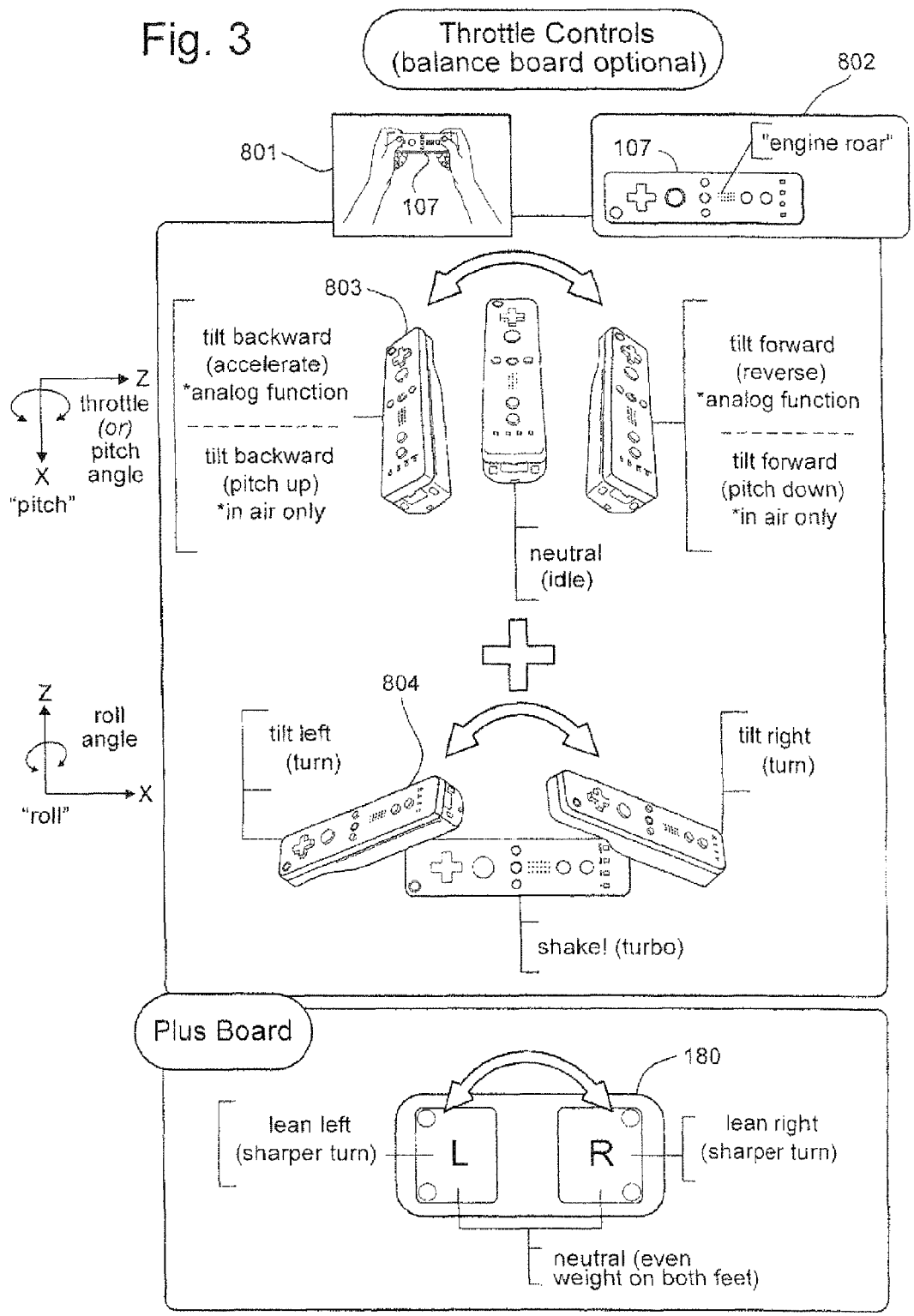

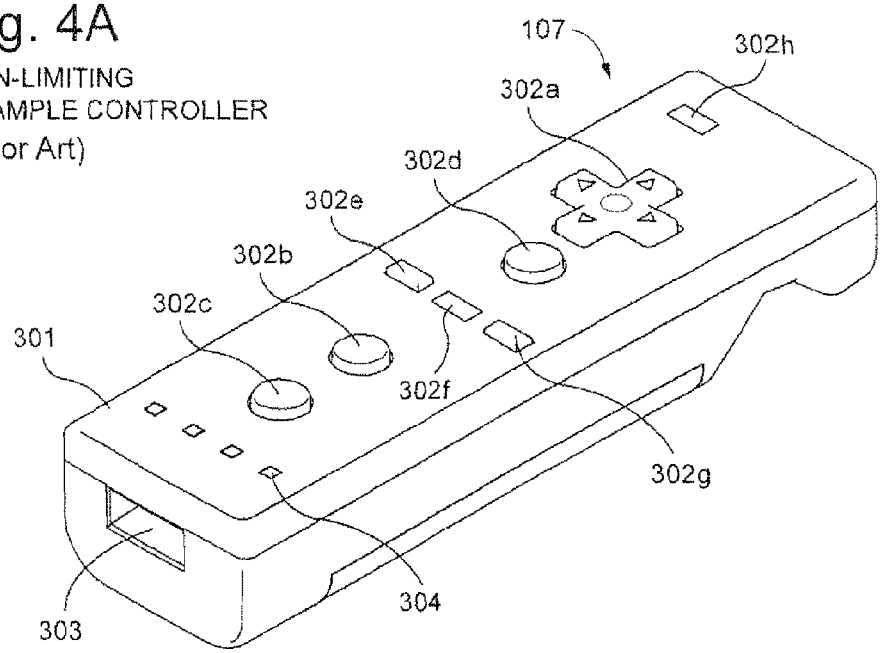
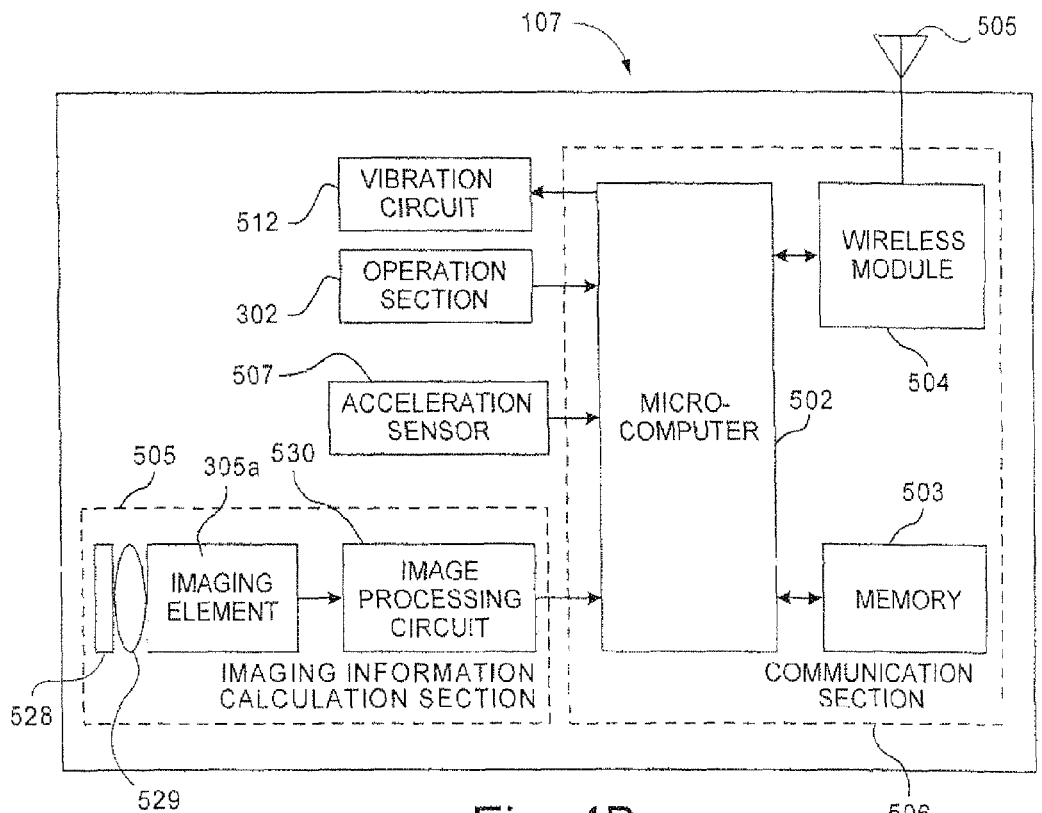

BALANCE BOARD
(Prior Art)

SIMULATED HANDLEBAR TWIST-GRIP CONTROL OF A SIMULATED VEHICLE USING A HAND-HELD INERTIAL SENSING REMOTE CONTROLLER

CROSS-REFERENCES TO RELATED APPLICATIONS

This application claims the benefit of priority from provisional application No. 61/237,332 filed Aug. 27, 2009, the contents of which is incorporated herein by reference.

TECHNICAL FIELD

The technology herein relates to computer graphics and simulation including but not limited to driving games, and more particularly to methods and apparatus for controlling simulated vehicle operation within a virtual gaming or other environment. In more detail, the technology herein relates to techniques using a hand-held remote controller with multi-axis inertial sensors such as accelerometers and/or gyro sensors to provide heightened sensations for simulator and game players, and to a fun-to-play gaming interface that realistically simulates a motorcycle, jet ski or other personal water craft, all-terrain vehicle, or any vehicle that uses a twist-grip type rotary throttle or other controller.

BACKGROUND AND SUMMARY

Video game enthusiasts have long been fascinated by the "driving game" genre of video games. Driving a simulated motorcycle holds a special allure—the legendary "call of the wild." This thrill is shared even among those who have never owned or ridden a motorcycle. And that allure is well-founded in the many rewards of biking that excite all the senses. In contrast to the confines of today's car, a motorcycle gives the rider the thrill of an unobstructed panoramic view—from the ground rush beneath the vehicle to the open road ahead. The driver feels the steady vibration and hears the mesmerizing "burble" of the engine purring. And, most of all, the driver feels gut-wrenching acceleration when he or she twists the accelerator on the handlebars and the engine roar rises and falls through each gear—all of which gives the driver the reassuring sensation of being, at last, in total control of a most powerful force and his or her own destiny.

Many in the past have gone to great lengths to try to realistically simulate the motorcycle experience. Past motorcycle driving games include for example 750 cc Grand Prix, Ducati Championship Racing, Enduro Racer, Excitebike (64), Fonz, GP500, Hang-On, Manx TT, Moto GP and progeny, Moto Racer, Moto Racer 2, Speed Kings, Suzuki TT Superbikes, Superbike 2001, Super Hang-On, Redline Racer, Road Rash, Suzuki Alstare Extreme Racing, Suzuka 8 Hours, Tourist Trophy, Superbikes Riding Challenge 07, and Superbike World Championship just to name a few. Such games use a variety of different input device configurations, game platforms and other user interface features all in an attempt to realistically simulate the experience of riding a motorcycle on a race track, a dirt track or the open road.

One challenge of past home and handheld video driving games has been imposed by the type of input devices that are commonly available to the home video game player. Whereas arcade game makers have been able to spend significant time, effort and expense to design custom controller interfaces that closely simulate a motorcycle or other vehicle, such controllers have generally not been available to the home video game user. Although certain hardware accessory makers have attempted in the past to market specialized input devices for particular game genres, many or most home video games have traditionally been played using the standard universal handheld controllers that are offered with the video platform. Such controllers have generally been very versatile and easy to use. However, controlling a simulated motorcycle by moving a joystick with one's thumb while often quite effective is not necessarily the height of realism.

On an actual motorcycle, jet ski, all-terrain vehicle, snowmobile, bicycle or other vehicle steered using handlebars, it is common to provide controls such as throttle in the form of rotary twist-grip mechanisms disposed on the handlebar hand grips. In some such vehicles, the twist-grip mechanism is used as a control interface to the engine throttle. Many twist-grip throttle controls are directly coupled to mechanical linkages that for example directly control the throttle plate of a carburetor on the engine. Rotating the grip with a forward rotating hand motion opens the engine throttle, delivering more fuel to the internal combustion chamber(s) to increase vehicle speed as well as concomitant engine roar. The twist-grip is typically spring loaded to be biased in a normal or low throttle (idle) position. A position of maximum travel is usually defined by associated linkages and/or a physical stop. The vehicle operator thus typically encounters physical resistance when attempting to rotate the twist-grip beyond a maximum position. Letting go of the twist-grip allows it to automatically return under a spring bias force to an idle position. Some modern twist-grip controls may use potentiometers, Hall effect sensors or other electronic sensors to sense rotary position which is then translated into signals used to control the engine. See for example U.S. Pat. Nos. 6,276,230 and 6,978,694, incorporated herein by reference as examples of handlebar throttle controllers of the type that may be found on a variety of powered vehicles with handlebars.

One past approach to simulate such controls has been to design and provide specialty controllers that closely model the look and operation of a set of handlebars. For example, some past known specialty controllers look much like a set of motorcycle handlebars including turning and leaning action, brake levers, twist-grip rotary controls and the like. Unfortunately, specialty controllers are typically relatively expensive to manufacture, and because of their specialty design, usually can be used only with certain games. For example, a specialty handlebar type controller could be used with bicycle, motorcycle, jet ski, snowmobile and other driving games simulating a power vehicle with handlebars, but probably could or would not be used with many other driving or other types of games. Because of the extra expense as well as the need for maintaining compatibility with game software, such specialty controllers generally have achieved only limited success.

Unlike past home video game systems, the Nintendo Wii video game system released in 2006 offers a different paradigm for handheld user interface controls. Through use of inertial sensors within the Wii Remote and Wii Nunchuk controllers, the Wii allows the game player to control game play by changing the posture or orientation of the handheld remote controller. Various successful driving games have been developed that make use of such features to control the direction of a simulated vehicle on the screen. Nintendo offers a steering wheel accessory called Wii Wheel™ that provides a fun, comfortable way to play driving and racing games with the Wii video game system. Designed to improve accuracy and control with compatible games, the Wii Wheel lets the game player steer like he or she is driving an actual car and makes racing games more realistic. The player snaps the Wii Remote controller into the Wii Wheel and then grasps and turns the Wii Wheel to steer the simulated vehicle. Such approaches have been quite useful and beneficial, but further improvements for motorcycle and other driving games are possible and desirable.

The technology herein simulates twist-grip vehicle controls to provide fun and interesting new capabilities. Exemplary illustrative non-limiting implementations are for example capable of precisely correlating player-controlled throttle inputs (e.g., X-axis "pitch") with cumulative motorcycle speed; player-controlled steering inputs (e.g., Y-axis "yaw") with slow-speed vehicle left/right turns; and player-controlled "roll" inputs (e.g., Z-axis tilt) with motorcycle lean angle in a hard or other turn—all using an inertial-sensing handheld controller that can also be used for a wide variety of other game genres.

In one exemplary illustrative non-limiting implementation, novel game software employs a hand-held controller, including inertial "tilt" or other sensors such as accelerometers, to control the path a simulated motorcycle or other vehicle takes through a virtual environment. Two-handed operation of a hand-held remote controller may be controlled by the game software to simulate a handlebar twist-grip type control. For example, to turn the vehicle left, a video game player can rotate (yaw) the controller in a counter-clockwise (CCW) rotational motion about the upright Y axis like handlebars. Similarly, to turn the vehicle right, the player can rotate (yaw) the controller in a clockwise motion (CW) about the upright Y axis. In the case of a motorcycle or jet ski simulation, the player can also effect a faster, more aggressive turn "leaning" the vehicle left or right, by rotating (rolling) the controller CCW or CW, respectively, about the forward Z axis. Moreover, the player can independently speed up or slow down the vehicle by twisting the controller like a motorcycle throttle, about the lateral X axis—that is, CCW toward the body (pitch) to accelerate, and CW away from the body to decelerate. Such rotation can also effect simulated engine noise and/or vibration. Vibration can also be used to simulate an end-of-travel position for a simulated twist-grip controller mounted on a handlebar grip.

In one exemplary illustrative implementation, the handheld controller may be held and manipulated in such a way as to simulate the handlebar throttle controller of a conventional motorcycle or jet ski. Forward/rearward rotation (pitch) of the handheld controller is sensed and can be used to control a speaker and/or vibration motor. These functions are not inherent in the conventional Wii system, and can be added by application (game-specific) software. The game software can for example control the vibration motor to provide haptic feedback that simulates end-of-travel or other effects that a motorcycle rider would feel when he twists the throttle to a maximum rotation position. Additionally, twisting the handheld controller as if it were a handlebar throttle controller may rev a simulated engine and provide images and sounds that would correspond to simulated throttle position.

Additional exemplary non-limiting features include:
- Use of an accelerometer to simulate an accelerator on a jet ski, motor cycle or other handlebar based vehicle
- Throttle control using handheld remote
- Haptic feedback: vibration intensity, rpms displayed on screen, speaker in Wii remote can provide audio feedback of engine revving
- Analog control without having to push any buttons
- Simulate end of travel with vibration
- Tilt: with Wii remote, nothing tells you where your range of motion is limited (free space)—with this technique, the vibration is off until you reach the end of virtual rotation, as you tilt it, it vibrates heavily simulating an end of motion (and user can see a meter on the screen)
- Can also work with the fit board (you feel like you are on the jet ski—as you weave back and forth on the board, the jet ski can cant)
- Use vibration for: (a) revving of engine, and (b) simulate end of travel when there is no physical end of travel.

BRIEF DESCRIPTION OF THE DRAWINGS

These and other features and advantages of exemplary illustrative non-limiting implementations will be better and more completely understood by referring to the following detailed description in conjunction with the drawings, of which:

FIGS. 1A-1C show exemplary illustrative non-limiting example game play simulating a handlebar type vehicle such as a motorcycle, jet ski, snowmobile, all terrain or other vehicle using simulated handlebars;

FIG. 3 shows additional detailed exemplary illustrative non-limiting modes of operation of the FIGS. 1A/1B game play in response to different orientations of a inertial-sensing handheld remote controller;

FIG. 4A shows an exemplary illustrative non-limiting handheld prior art controller having inertial sensing capability;

FIG. 4B shows an exemplary illustrative non-limiting block diagram of the FIG. 4A prior art controller;

DETAILED DESCRIPTION

Figure 1A:
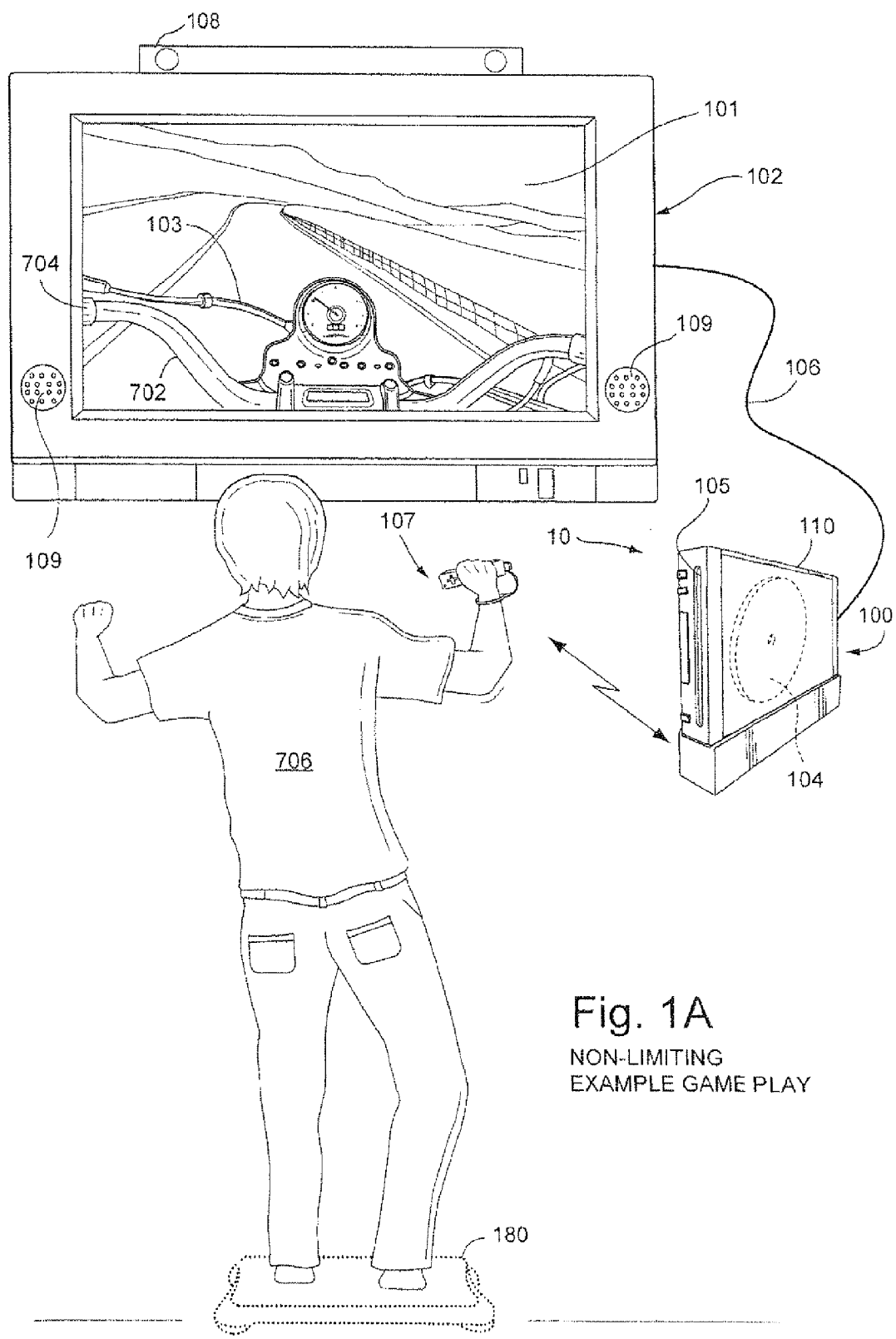
Figure 1B:
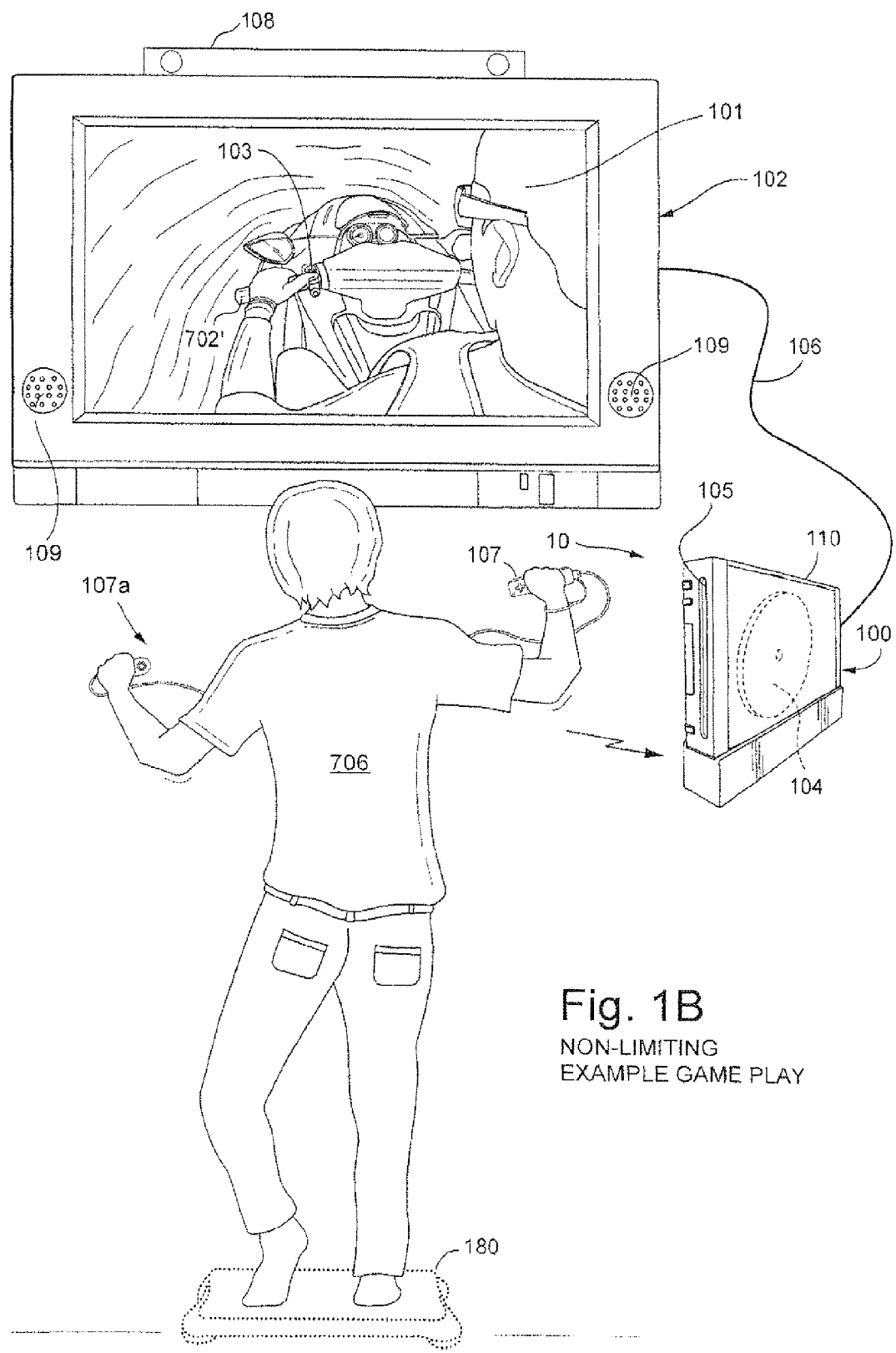

FIGS. 1A and 1B show an exemplary illustrative non-limiting game play arrangement 10. As shown in these diagrams, a display device 102 such as a conventional television set provides an audiovisual display of a simulated vehicle traveling through a simulated three-dimensional scene. In the examples shown and described herein, the simulated vehicle includes a set of handlebars 702 including hand-grips 704. In the example shown in FIG. 1A, the simulated vehicle comprises a motorcycle. In the FIG. 1B implementation, the simulated vehicle may comprise a jet ski or other personal water craft. FIG. 10 shows that the view can be first person or third person. Of course, these are just non-limiting examples. Any vehicle and/or view could be simulated, with particular advantages being provided for vehicles that have handlebar or like steering controls including twist-grip throttle or other controls.

In the example shown in FIG. 1A, the video game player 706 holds a handheld remote controller such as for example a Wii remote in one or both hands. The controller 107 in this use under game software control simulates a twist-grip controller rotatably mounted on a handlebar of a conventional vehicle. For example, when the game player 706 manipulates the position of handheld controller, inertial sensors within the handheld controller may be used to sense aspects of such manipulation (e.g., orientation) and provide inputs to a game console 400 executing appropriate software stored therein (e.g., on an optical disk 104). For example, when the game player 706 "pitches" the handheld controller 107 based on up/down wrist movements, such rotation can be sensed and used to control simulated throttle. Similarly, it is possible to, for example, simulate the steering of the simulated vehicle handlebars 702 by rotating handheld controller 107 about the "yaw" axis to thereby simulate the handlebars being pulled toward or pushed away from the vehicle operator. In certain exemplary illustrative non-limiting implementations, it is possible to simulate and detect "lean" of a motorcycle by detecting the rotation of handheld controller 107 about the "roll" axis. In other exemplary illustrative non-limiting implementations, it is possible to also detect such lean 180 using additional inputs such as a Nintendo prior art balance board 180.

In the exemplary illustrative non-limiting implementation, the game system 100 and software can respond to inputs of handheld controller 107 in a variety of ways. In one exemplary illustrative non-limiting implementation, the game system 100 can for example control the graphics displayed on display 101 to correspond to the inputs provided by controller 107. For example, when the game player 706 yaws the controller 107 by rotating about the Y axis, the simulated graphics modeling the simulated vehicle handlebars 702 can be observed to rotate in the direction of yaw. Similarly, when the game player 706 leans one way or the other and such lean is detected based on roll of the handheld controller 107, the simulated vehicle that system 100 displays on display 101 can be observed to lean one way or the other. In some exemplary illustrative non-limiting implementations using the balance board 180, such lean may also be detected using the balance board input device 180. In addition, when the game player 706 pitches the handheld controller 107, the game system can respond by simulating additional speed or less speed (as the case may be) on display 101, and may also provide additional audio and/or haptic feedback such as for example audio generated by television speakers 109 and/or by vibration created by a vibration motor disposed within remote controller 107.

FIG. 1B shows an alternative implementation wherein the controller 107 is connected to an additional accessory controller 107a such as the Wii Nunchuk accessory controller. In the example shown, the handlebar 702' may be thus simulated by two different inertial-sensing controllers, one held in each hand.

Figure 2:
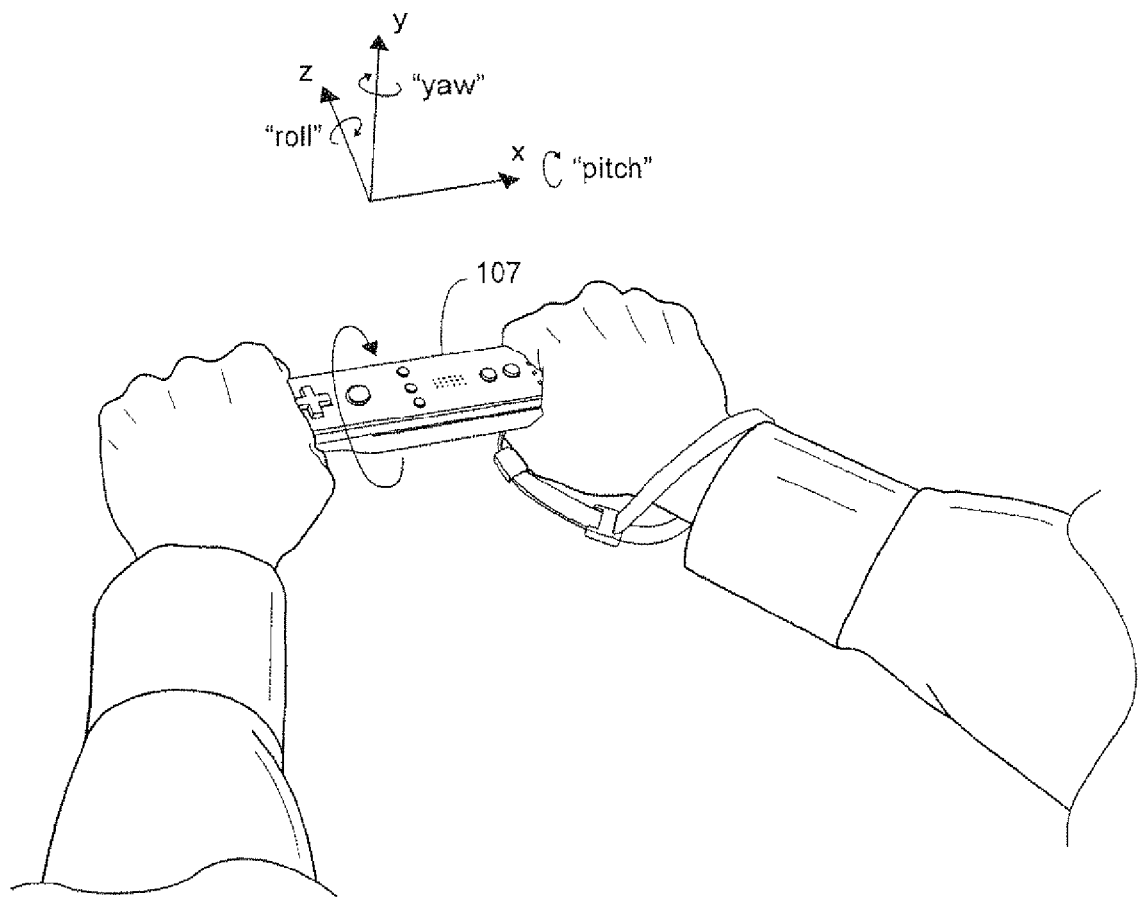
FIGS. 2, 2A-2C show exemplary illustrative non-limiting ways to hold and twist a remote controller to control the FIGS. 1A/1B game play.
Figure 2A:
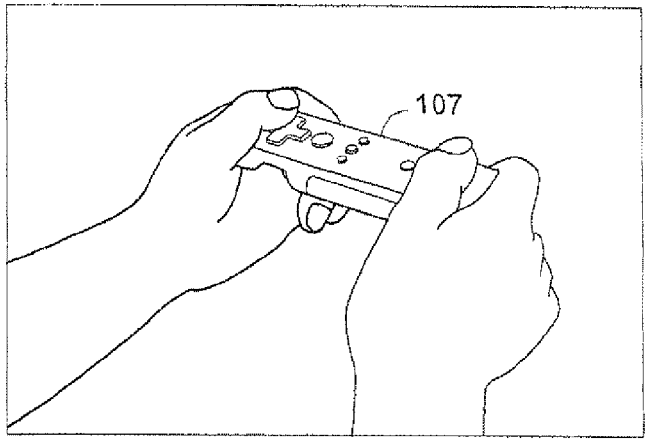
Figure 2B:
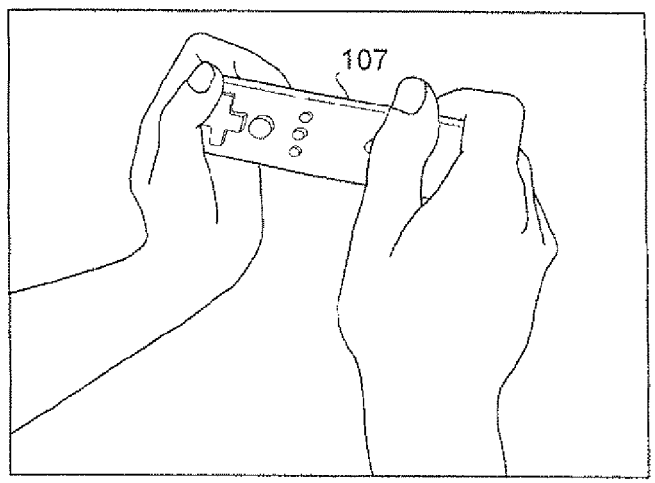
Figure 2C:
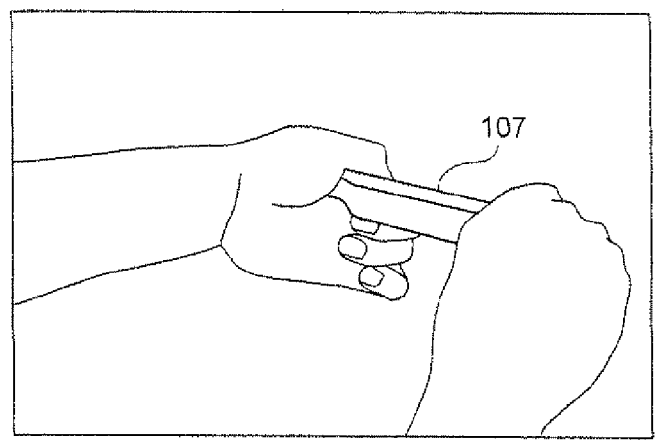

FIG. 2 shows an exemplary illustrative non-limiting diagram of one way to hold remote controller 107, with an example set of Cartesian coordinate axes interposed onto the figure. In the example shown, the "y" or "yaw" axis may be vertical with respect to gravity, the x or "pitch" axis may be perpendicular to the y axes and the z or "roll" axis, and the z axis may similarly be orthogonal to the x and y axes but point toward the television 102. In this example, angular orientation in the x axis may be used to simulate a throttle control just as angular orientation of a twist-grip controller on the handlebars of a motorcycle may be used to control the motorcycle throttle. FIGS. 2A, 2B and 2C show example orientations corresponding to no pitch or neutral (FIG. 2A), pitch up (FIG. 2B), and pitch down (FIG. 2C). Roll orientation in the "z" axis may be used to detect "lean" and thus provide for steering. In some exemplary illustrative non-limiting implementations, yaw orientation about the y axis may be used to simulate steering position of the handlebars and thus provide a steering function.

FIG. 3 shows additional detail of how manipulation of handheld controller 107 may be used to affect simulated game play. In the example shown, one example way of holding controller 107 is in two hands as shown in the upper part of FIG. 3. When held in this way, tilting (pitching) the controller 107 backwards may simulate an acceleration function whereas pitching it forward may simulate a deceleration and/or reverse function. A neutral pitch orientation can be used to simulate neutral (idle). In cases where the simulated vehicle is in the air such as for example a flying vehicle, such pitching backwards and forwards may also cause the nose of the vehicle to pitch up down respectively. In the example shown, neutral pitch position of the handheld controller 107 may be used to maintain a constant velocity.

Similarly, as shown in the center of FIG. 3, when the handheld controller 107 is tilted (rolled) to the left, such roll can be sensed and used to steer the simulated vehicle to the left. Similarly, when the handheld controller is rolled to the right, such roll may be detected and used to steer the simulated vehicle to the right. When the handheld controller is shaken, this can activate an additional function such as for example a "turbo" acceleration function (e.g., as if a rocket on the back of the vehicle activates to provide an additional burst of acceleration).

As shown in the bottom of FIG. 3, when the balance board input device 180 is used, leaning to the left may be used to provide a sharper left turn to the vehicle whereas leaning to the right can be sensed and used to provide a sharper turn to the right. When the player distributes his or her weight equally on both feet, then this "no lean" situation may be used to provide a neutral or straight-steering scenario.

In the exemplary illustrative non-limiting implementation, the video game player holds hand-held controller 107 sideways in both hands—with each hand holding one end of the remote 107, as shown in the top insert 801 of FIG. 2—and uses it to simulate steering motorcycle handlebars, including twisting the throttle to accelerate/decelerate, as shown at the top 803 in FIG. 2.

The following discussion uses the conventional terminology of "pitch", "yaw" and "roll" (or "tilt") about orthogonal axes X/Y/Z—where "pitch" refers to rotation about the X axis, "yaw" refers to rotation about the Y axis, and "roll" refers to rotation about the Z axis (see FIG. 2).

When the player uses both hands to roll the hand-held controller 107 horizontally around the forward Z axis, the simulated motorcycle 103 will lean over into a turn, as shown at the center 804 of FIG. 3. Thus, for example, when the game player's left hand pushes downward while the right hand pulls upward, the simulated motorcycle will lean over into a left turn. Similarly, when the game player's right hand pushes downward while the left hand pulls upward, the simulated motorcycle will lean over into a right turn. As an aggressive alternative, standing on a Wii Fit Board 180, the player can shift his or her weight left or right to effect an even sharper lean into a left or right turn, respectively, as shown at the bottom 805 of FIG. 3. Buttons on the controller 107 can be operated by one or both thumbs, for example, to provide other exhilarating vehicle effects (e.g., firing rockets, firing weapons, etc).

In an exemplary illustrative non-limiting implementation, part of the virtual landscape can include opportunities for the simulated motorcycle 103 to go airborne and fly through the air. For example, the motorcycle may be driven up and over a ramp or other jump at a high speed from which it becomes suspended in mid-air—or the motorcycle may be driven off a cliff or other sudden drop. Unlike the real world where a motorcycle would immediately drop due to the force of gravity, this implementation permits the simulated motorcycle 103 to literally fly through the air while descending slowly toward the ground 9. The simulated velocity of the motorcycle as it travels through the air can have a direct relationship to the motorcycle's velocity before it left the ground.

For example, it is possible to extend the length and range of this airborne flight by minimizing the downward force of gravity being applied to an otherwise ballistic trajectory. It would likewise be possible to slow down or speed up the rate of airborne descent, for example, by modulating the effect of gravity as a linear function of the player pitching the motorcycle nose up or nose down.

In one exemplary illustrative non-limiting implementation, the hand-held remote 107 can be moved in another degree of freedom—by changing its pitch about the X axis. As shown in FIG. 2A, if the player holds hand-held remote 107 in a natural and level attitude, the simulated motorcycle will maintain an attitude in mid-air that is correspondingly level. When the player twists the remote 107 backward, thereby establishing an upward pitch, the nose of the simulated motorcycle pitches upward correspondingly while it is in mid-air (FIG. 2B). When the player twists the remote 107 forward, thereby establishing a downward pitch, the nose of the simulated motorcycle pitches downward correspondingly while it is in mid-air (FIG. 2C).

Example Prior Art Handheld Controller Details

With reference to FIGS. 4A and 4B, example prior art controller 107 is shown including a housing 301 on which operating controls 302a-302h are provided. Housing 301 has a generally parallelepiped shape and is sized to be conveniently holdable in a player's hand.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively an "X" button, a "Y" button and a "B" button and buttons 302e through 302g are respectively a select switch, a menu switch and a start switch, for example. As shown in FIG. 4B, an imaging element 305a is provided on a front surface of controller housing 301. Imaging element 305a and associated optical elements 528, 529 and image processing circuit 530 is part of an imaging information calculation section of controller 107 that analyzes image data received from markers 108 (108a and 108b).

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

As shown in the block diagram of FIG. 4B, controller 107 includes a three-axis, linear acceleration sensor 507 that detects linear acceleration in three directions, i.e., the up/down direction (Y-axis), the left/right direction (Z-axis), and the forward/backward direction (X-axis). Alternatively, a two-axis linear accelerometer that only detects linear acceleration along two axes may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 507 is subjected to dynamic accelerations by, for example, the hand of a user, as will be explained in detail below.

Alternatively, or in addition, gyro sensors may be used within controller 107 to measure for example angular rate (i.e., the rate at which the handheld controller is rotated about different axes). One example illustrative non-limiting implementation is the Wii MOTIONPLUS accessory which may be attached to the handheld controller 106 to provide, in addition to the three axes of linear acceleration already provided by the controller, an additional three axes of angular rate sensing. Such inertial sensing of three axes of linear acceleration and three axes of angular rate can be used advantageously to for example sense the orientation and rotation of the controller 107 during the game play shown in FIGS. 1A and 1B.

Vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player holding controller 107.

As described above, acceleration sensor 507 detects and outputs the acceleration in the form of components of three axial directions of controller 107, i.e., the components of the up-down direction (Y-axis direction), the left-right direction (X-axis direction), and the front-rear direction (Z-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs game software processing. If communication section 506 is structured using Bluetooth (registered trademark) technology, controller 107 can also receive data wirelessly transmitted thereto from devices including game console 100.

The exemplary illustrative non-limiting system described above can be used to execute game software stored on optical disk 104 or in other memory that controls it to interactive generate displays on display 101.

Exemplary Video Game Platform

Figure 6:
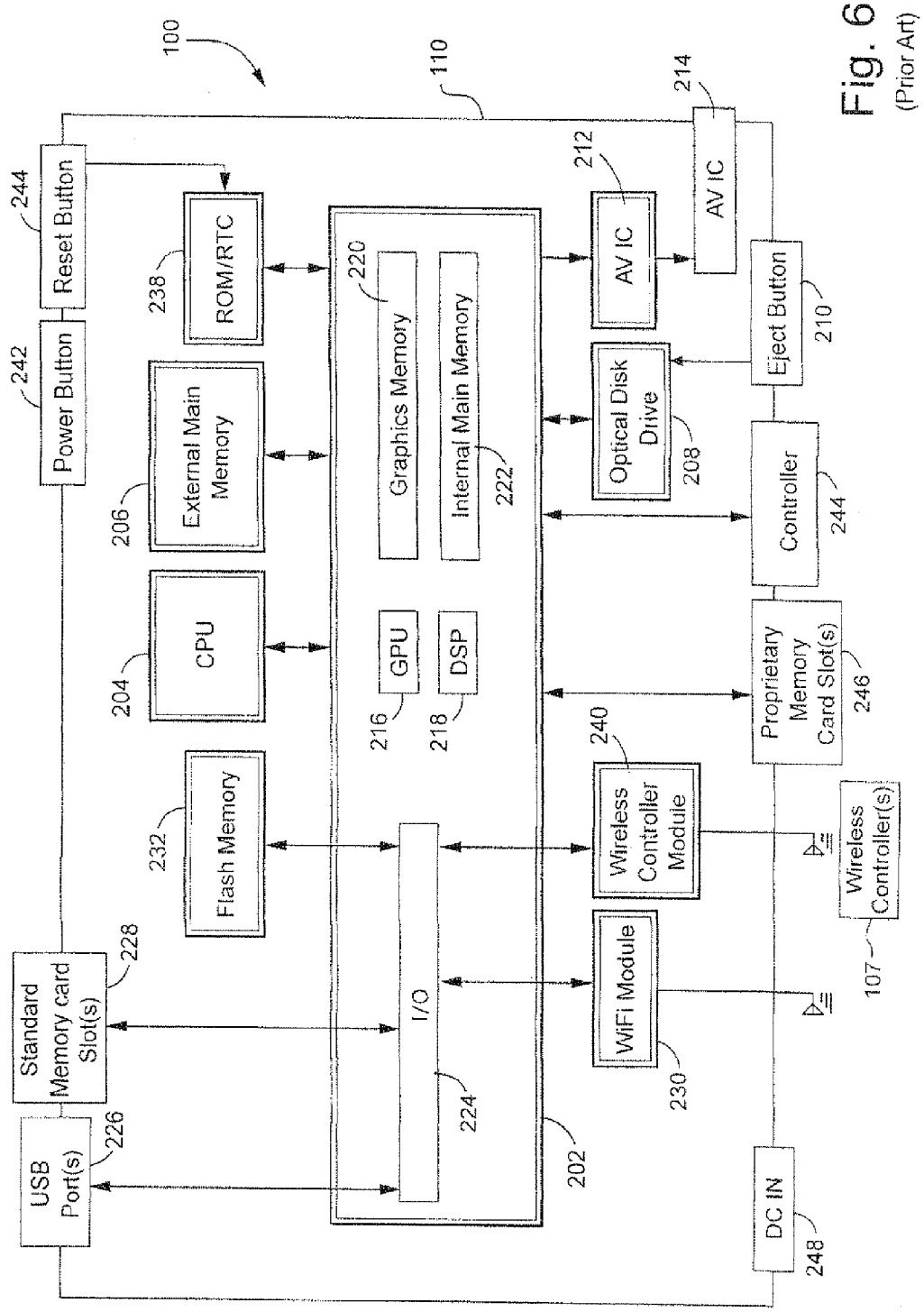
FIG. 6 shows an exemplary illustrative non-limiting block diagram of a prior art gaming system of the type that can be used to provide the FIGS. 1A/1B exemplary game play.

FIG. 6 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display 101 of television 102, to which game console 100 is connected by cable 106.

Audio associated with the game program or other application is output via speakers 109 of television 102. Meanwhile, the game player holds a remote control 107 in one hand and a companion accessory controller 107*a* in another hand, or may hold the controller 107 in both hands as described above.

While an optical disk 104 is shown in FIG. 1 for use in storing video game software, the game program, or other application may alternatively or additionally be stored on other storage media such as semiconductor memories, magneto-optical memories, magnetic memories and the like and/or downloaded over a network or by other means.

Controller 107 wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) may be used for the wireless transmissions between controller 107 and game console 100.

With reference to the block diagram of FIG. 2, game console 100 includes a RISC central processing unit (CPU) 204 for executing various types of applications including (but not limited to) video game programs. CPU 204 executes a boot program stored in a boot ROM (not shown) to initialize game console 100 and then executes an application (or applications) stored on optical disc 104 which is inserted in optical disk drive 208. User-accessible eject button 210 provided on housing 110 of game console 100 may be used to eject an optical disk from disk drive 208.

CPU 204 is connected to system LSI 202 that includes graphics processing unit (GPU) 216 with an associated graphics memory 220, audio digital signal processor (DSP) 218, internal main memory 222 and input/output (10) processor 224. Processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Flash memory 232 stores, by way of example without limitation, game save data, system files, internal applications for the console and downloaded data (such as games).

Figure 5:
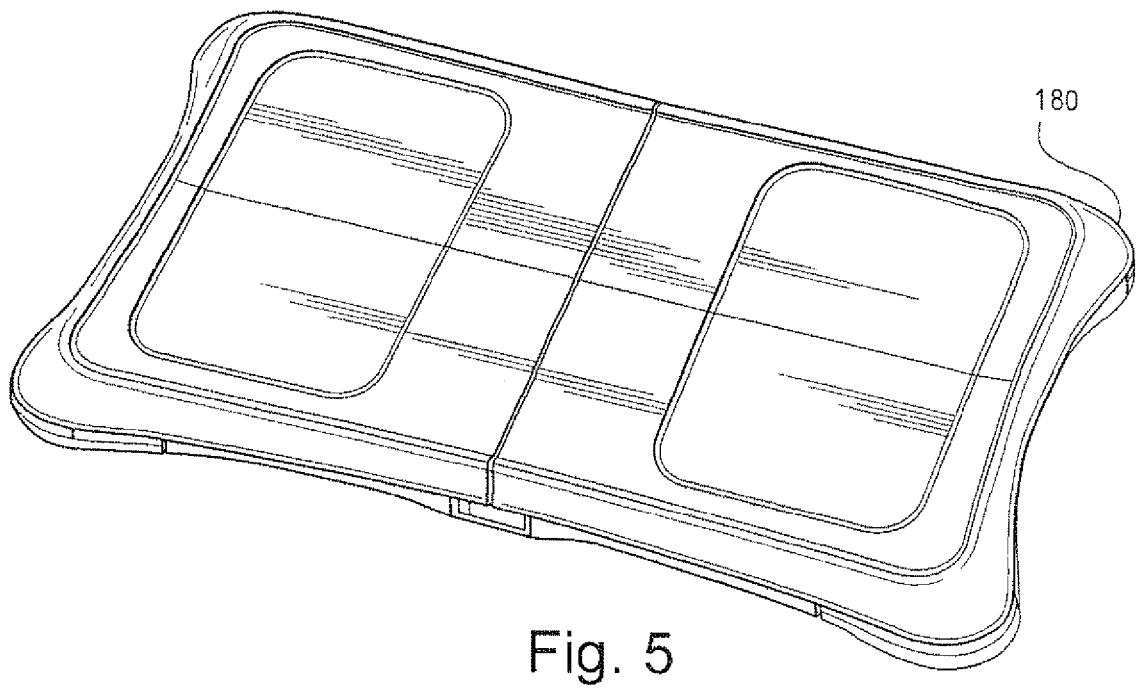
FIG. 5 shows an exemplary illustrative non-limiting prior art balance board controller that detects weight differentials.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry, shown and discussed with FIG. 5 (below). By way of further example without limitation, controller 107 is provided with a small built-in speaker (shown at 802 in FIG. 6) and audio signals for output from this speaker may be wirelessly communicated to controller 107 via wireless controller module 240. By way of still further example without limitation, controller 107 may be provided with, or connected to, a display device (not shown) and display signals for output from this display device may be wirelessly communicated to controller 107 via wireless controller module 240.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

Example Video Game or Simulation Operation

Figure 7A:
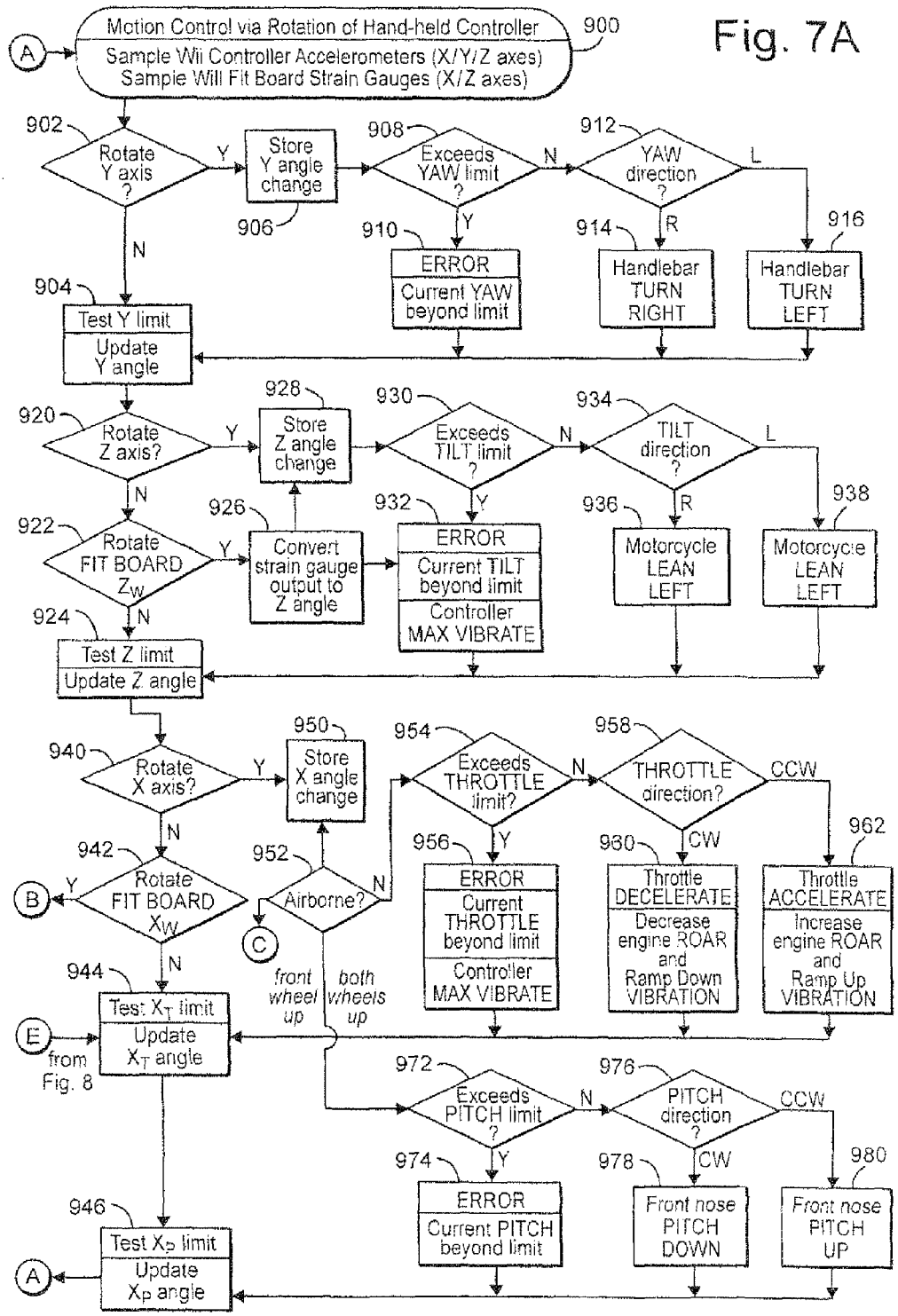
FIGS. 7A and 7B show an example illustrative non-limiting flowchart of game program control steps that can be used to provide the FIGS. 1A/1B exemplary illustrative game play.
Figure 7B:
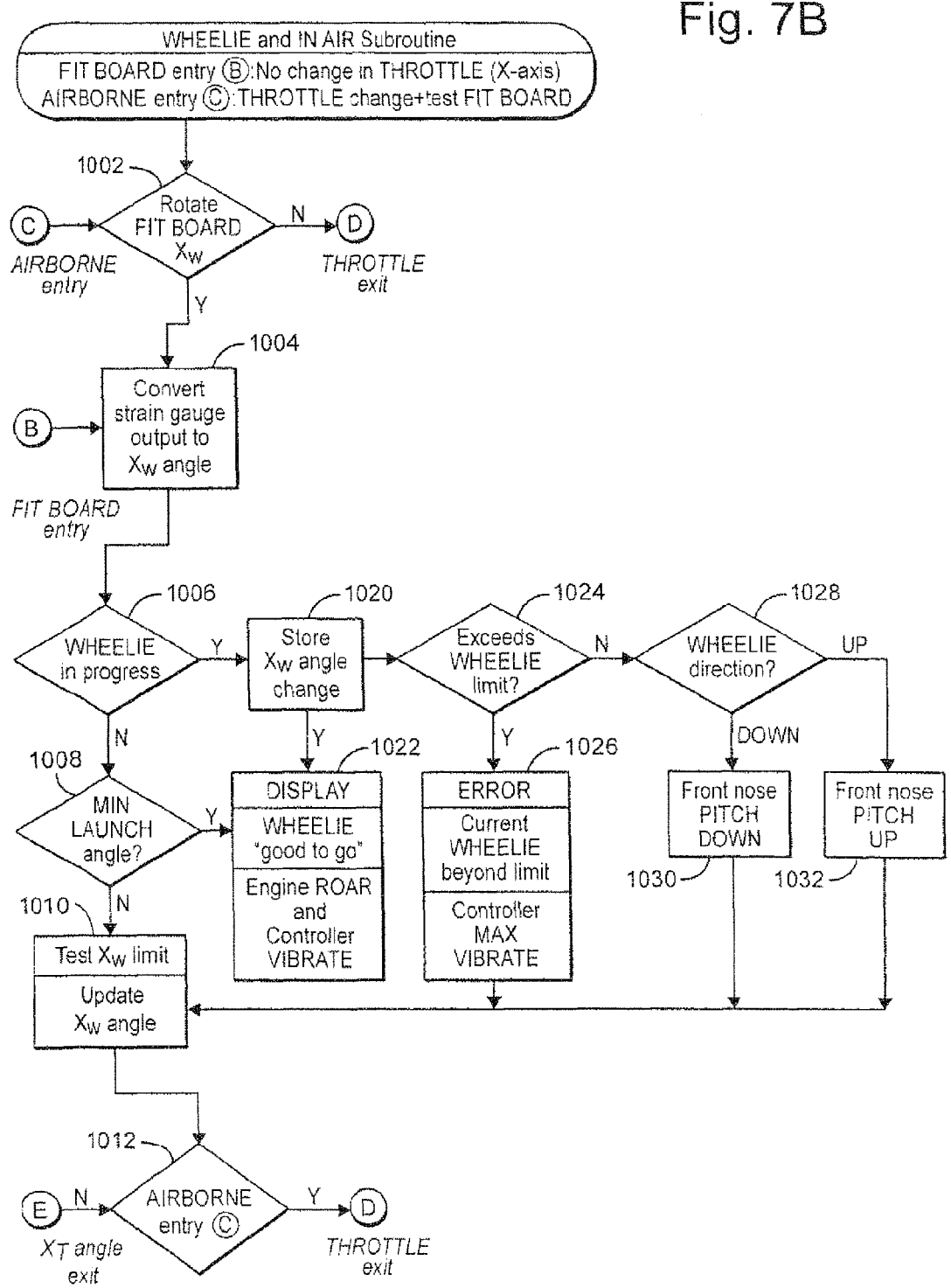

FIGS. 7A and 7B show an exemplary illustrative non-limiting use of console 100 and overall video game system to play a driving game or motion simulation involving, for example, a motorcycle or other vehicle through a virtual landscape.

FIGS. 7A, 7B exemplary illustrative non-limiting software functionality may be disposed on the storage device such as an optical disk inserted into console 100 or a flash or other resident or non-resident memory into which software code is downloaded. As is customary in the art of programming, prior to executing its mainline loop, the program resets all status, control, and other operating registers, counters, indexes, and switches to ZERO, and loads any pertinent control parameters, operating limits, motion algorithms, or data constants that may be necessary to successfully run the program. For this exemplary illustrative non-limiting program implementation, the program can monitor orientation about the 3 orthogonal axes X/Y/Z depicted in FIG. 2, as follows:

| Exemplary Axes for Sensing Simulated Motorcycle Handlebars | |
|---|---|
| Axis | Rotation about Axis |
| Y (yaw) | Yaw or Steer (slow turn) |
| Z (roll) | Tilt or Lean (fast turn) |
| Zw | Tilt or Lean (hard turn) via Wii Fit Board |
| Xt (pitch) | Throttle or Engine Speed |
| Xp (pitch) | Motorcycle Pitch (up/down) (airborne) |
| Xw | Rider Pitch (up/down) via Wii Fit Board |

Any or all of these axes can be engaged within the same simulation period to provide an array of multiple system motion modes, for example:

| | Motorcycle Modes | | | | |
|---|---|---|---|---|---|
| | Motorcycle on Ground | | | Motorcycle Airborne | |
| Axes | Straight Ahead | Slow Turn | Fast Turn | Front Wheelie | Both Wheels |
| Y | | X | | | |
| Z | | | X | | |
| Zw | | | X | | |
| Xt | X | X | X | X | |
| Xp | | | | | X |
| Xw | | | | X | X |

The above chart shows exemplary axes that initiate and/or control the motorcycle's motion—e.g., a strong backward lunge about Xw can initiate a "wheelie," while smaller throttle bursts about Xt can fine tune it. Other axes are still active or "in play", whether they contribute to or detract from the cycle's current equilibrium—e.g., turning the handlebars during a fast turn, or leaning hard left during a "wheelie", can lead to a spectacular crash.

FIGS. 7A and 7B delineate an example mainline program flow that selectively enables these and other exemplary modes, based on player-controlled angular rotation about any of the independent system axes, which are detected by the 3-axis accelerometer 507 of the hand-held remote controller 107 and, optionally, by strain gauges of the Wii Fit Board 180.

Referring to FIG. 7A, once the simulation for motorcycle 103 is begun, the exemplary illustrative nonlimiting implementation causes the game program running within console CPU 204 to begin sampling the outputs of the remote 107's accelerometers and the Fit Board 180's strain gauges. The program then continuously executes its 10-step mainline sampling loop, awaiting the chance to process the next change in orientation about X/Y/Z detected for example as follows:

| step | axis | Sampling Loop |
|---|---|---|
| 900 | all | sample all orientation detected by the controller or Fit Board |
| 902 | Y | any player-controlled steering rotation about the Y axis? |
| 904 | Y | if none, test the cycle's last-stored steer angle against current Y limit (which may have changed), and update any valid increment in the Y angle (to a new "yaw" angle) |
| 920 | Z | any player-controlled tilt rotation about the Z axis? |
| 922 | Zw | if none, any alternative tilt rotation about the Zw axis? |
| 924 | Z | if none, test the cycle's last-stored lean angle against current Z limit (which may have changed*), and update any valid increment in the Z angle (to a new "tilt" angle) |
| 940 | X | any player-controlled throttle rotation about the X axis? |
| 942 | Xw | if none, any alternative pitch rotation about the Xw axis? |
| 944 | Xt | if none, test the cycle's last-stored throttle angle against current Xt limit (which may have changed), and update any valid increment in the Xt angle (a new throttle angle) |
| 946 | Xp | if none, test the cycle's last-stored pitch angle against current Xp limit (which may have changed), and update any valid increment in the Xp angle (a new "pitch" angle) |
| Exit "A" | | program returns to step 900 to repeat the sampling loop |

The following discussion describes the mainline subroutines shown in FIGS. 7A, 7B that process each incremental motion detected by the above mainline sampling loop on any of the system's independent axes.

As for motorcycle "yaw", the cycle can generally steer in smaller angles around a slow turn, without the need to lean left/right. If a player makes a rotation in "yaw" about the Y axis at 902, the new Y angle increment is stored at 906 for validation against the current yaw minimum and maximum (min/max) limits at 908. If the new angle exceeds either yaw limit (e.g., too large an increment for a gradual turn), the program flags the limit error at 910 to notify the player via visual/aural means, and to prevent the current Y angle from being updated at 904. Otherwise, if the new Y angle clears the limit test, the program can honor the requested move. It next tests the requested yaw direction at 912, and either steers the handlebars right at 914 or left at 916, as requested, before returning to 904.

As for motorcycle "lean", the cycle can generally lean over at higher angles around a fast turn, without the need to steer left/right. However, owing to the much higher speed and many complex factors (like road surface/banking, tire tread/friction, rapidly changing turn radius, etc.), this becomes a far more serious maneuver than simple steering. In any event, in the real world, the rider cannot ignore the basic laws of physics, which the program uses to calculate min/max limits for the current lean angle (and optimum tilt angle between), e.g., for the cycle's instantaneous velocity and turn radius.

Since the turn radius is related to speed and lateral acceleration, in order to sustain a 1 G turn, the rider may to turn at a 45° maximum lean angle. Doubling the speed will quadruple the G's (due to the velocity being squared). These are the sort of basic relationships the program can use to calculate instantaneous max/min lean angle for the current motion parameters, so that the player is actually getting a degree of real-world motorcycle feel.

If a player makes a rotation in "lean" about the Z axis at 920, the new Z angle increment is stored at 928 for validation against the current tilt min/max limits at 930. If the new angle exceeds either tilt limit (e.g., too large an increment for a gradual turn), the program flags the limit error at 932 to notify the player via visual/aural/tactile feedback, and to prevent the current Z angle from being updated at 924—and, for this error, the program can instruct the remote controller 107 to alert the player to his or her impending disaster. Otherwise, if the new Z angle clears the limit test, the program can honor the requested move. It next tests the requested tilt direction at 934, and either leans the cycle over to the right at 936 or left at 938, as requested, before returning to 924.

Optional Wii Fit Board

As an alternative user-friendly control option, the game player can also stand on a standard Wii Fit Board 180 and lean hard left or hard right (as depicted at the bottom 805 of FIG. 8) to force a faster, sharper, more aggressive lean into the turn—while, at the same time, emulating the actual physical motion of the real-world motorcycle rider (like a downhill racer in a wide slalom turn). Accordingly, the program is designed to continuously sample the strain gauges of the Fit Board 180 at 922, to offer an exciting high-speed option for the more demanding player. The output from these analog gauges is proportionally converted to an equivalent Z angle increment at 926 and submitted for storing at 928, thereafter proceeding as above.

The addition of an optional Fit Board 180 provides two potentially independent co-linear axes (i.e., remote controller axis Z and Wii Fit Board axis Zw) for detecting lean. One possibility is to give priority to the Fit Board 180 over the controller 107

For all system modes but Airborne, the player can accelerate/decelerate by simply twisting the remote 107 like a throttle. If a player makes such a "twisting" rotation about the X axis at 940, the new X angle increment is stored at 950 for validation against the current tilt min/max limits at 954. However, before such testing, the program can first determine at 952 which of 3 system modes it is in: [1] if both wheels are up off the ground, the cycle is "airborne" and it proceeds to 972; [2] if only the front wheel is up, the player is doing a "wheelie", so it next proceeds to the Wheelie Subroutine via exit "C" (re-entering at 1002 in FIG. 7B); [3] otherwise, both wheels are down, indicating the player is using the remote as a normal throttle, and it proceeds to angle Xt limit test 954.

If the new throttle angle Xt exceeds either "pitch" limit (e.g., an angle increment that takes it past its real-world end of travel), the program flags the limit error at 956 to notify the player via visual/aural/tactile means (e.g., activates the vibration motor) and to prevent the current Xt angle from being updated at 944 to differentiate this end-of-travel limit from the normally simulated "engine vibration." Otherwise, if the new angle Xt clears the limit test, the program can honor the requested move. It next tests the requested throttle direction at 958, and either decelerates the cycle at 960 or accelerates it at 962, as requested, before returning to step 944. At the same time, the program proportionally decreases (at 960) or increases (at 962) two special effects that give the player the illusion of riding a cycle: the "roar" of a powerful engine, rising and falling via the TV speakers and/or a built-in speaker on the controller (at 802 in FIG. 7A); and, the vibration of the engine, just it as feels spreading up the frame to the handlebars, rising and falling synchronously with the engine roar.

As for the system's Airborne mode, the player can also use the dual-purpose X axis to control a fanciful "pitch" up or down as the motorcycle "flies" through the air, e.g., off a long ramp or high cliff. These dual purposes are shown at 803 in FIG. 7A: [1] as an engine throttle (Xt axis) while on the ground; [2] as a means to pitch the cycle up/down (Xp axis) while airborne, where its use as a throttle has absolutely no effect. As for such fanciful airborne "pitch", there are no real-world limits that could apply to a motorcycle that would otherwise drop like a rock—so any such pseudo-limits are purely a matter of design choice, e.g., to make the fanciful simulation more appealing to the player's imagination.

The exemplary illustrative non-limiting implementation thus applies different constant or non-constant velocity correction factors for forward and backward tilt. Backward tilt of controller 107 can slow the vehicle down or reverse it, and forward tilt can speed the vehicle up. As another non-limiting example, forward tilt of controller 107 can slow the vehicle down, and backward tilt can speed the vehicle up. These effects can be used in conjunction with, for example, a constant simulated gravitational force to permit the player to control where the motorcycle lands. The force of gravity need not be accurate—for example, rather than 9.8 meters/second, some other lower constant (such as 0.98 m/s) could be used so the cycle would remain suspended in the air longer than in the real world. Other functions, effects and simulations are possible. For example, as another alternative user-friendly control option, the game player can also stand on a Wii Fit Board (as described above with FIGS. 7A, 7B) and lean forward and back to force a faster, sharper pitch down and up, respectively. This rotation about the Fit Board's Xw axis can be smoothly integrated with the remote's X axis in the same manner as the Zw axis was with the remote's Z axis just described.

If a player makes a rotation in "pitch" about the X axis at 940, the new Xp angle increment is stored at 950 for validation against the current pitch min/max limits at 972, after the intervening test for the airborne simulation mode at 952. If the new angle exceeds either pseudo-limit, the program flags the limit error at 974 to notify the player via visual/aural feedback, and to prevent the current Xp angle from being updated at 946. Otherwise, if the new Xp angle clears the critical limit test, the program can honor the requested move. It next tests the requested pitch direction at 976, and either pitches the front nose down at 978 or up at 980, as requested, before returning to 946.

FIG. 7B shows program flow for an exemplary Wheelie or airborne subroutine. A "wheelie" is an exciting crowd-pleasing stunt by veteran motorcycle riders who have mastered the technique of manipulating 4 dynamic controls into a state of airborne equilibrium: [1] carefully regulating engine speed via the throttle (axis Xt herein); [2] gradually slipping the clutch, e.g., to get the motorcycle to initially launch upward (not simulated herein); [3] tapping the rear brake pedal to fine tune the "nose angle" up and to kill the wheelie or abort a failed attempt (not simulated herein); and [4] adjusting rider attitude or "pitch" forward/back to further fine tune the "nose angle" up (axis Xw herein, also used to launch the wheelie). In general, it can take many weeks, or months, for even a veteran rider to master this complex maneuver, without injury, and to ultimately sustain a "wheelie" at the same nose angle up across long distances. It is thus a very exciting move.

With no rear brake or clutch controls herein, the "wheelie" maneuver can be entirely controlled by the co-linear "throttle" axis Xt (using the remote controller) and rider "pitch" axis Xw (using the Wii Fit Board 180). As a specialized technique for initiating a wheelie herein, the player can perform a quick, emphatic "lunge" backward to initially bring the cycle's nose up off the ground. Thereafter, he can behave like a normal rider, rocking gently back and forth to "fine tune" the nose up (Xw angle). This challenges him to try to reach a real-world multi-axis equilibrium atop the cycle, avoiding any side-to-side lean (Xz angle) that would destroy the equilibrium and bring him tumbling down.

Looking again at FIG. 7B, the exemplary Wheelie subroutine has 2 entry points (Fit Board "B" and Airborne "C") and 2 exit points (Throttle "D" and Xt angle "E"). At entry B, the subroutine knows there was no change in throttle (X-axis), so it can ignore throttle and return via exit E at 1012. At entry C, the subroutine knows there was a throttle change, so after testing rotation of Fit Board angle Xw, it must return via throttle exit D at step 1002 (or 1012) to let the mainline twist the throttle up or down.

If the player shifts his weight on the Fit Board forward or back, the subroutine next converts the front-to-back X output from the Fit Board's strain gauges proportionally into an equivalent Xw angle increment at step 1004, just as was done for the Fit Board's side-to-side Z output at step 926 (FIG. 7B). The program next tests whether a "wheelie" is already in progress at 1006, so it can process the new Xw angle. If not, it must determine at 1008 whether the player's initial emphatic "lunge" backward was strong enough to reach or go beyond the minimum Xw launch angle sufficient to launch a minimum-angle wheelie. If not, the player's attempt to launch a wheelie is aborted and the program exits out with a nominal Xw angle update at 1010. But, if the player's lunge was sufficiently strong to launch the wheelie at 1008, the program rewards him with a green-light "Good to Go" display, coupled with exciting engine roar and controller vibration at 1022, and proceeds to store the validated initial Xw angle at 1020.

If a player makes a rotation in "pitch" about the X axis at step 1002 or 942 while a wheelie is in progress at 1006, the subroutine next stores new Xw angle increment at 1020 for validation against the current "wheelie" min/max limits at 1024. If the new Xw angle exceeds either limit, the program flags the limit error at 1026 to notify the player via visual/aural/tactile feedback, and to prevent the current Xw angle from being updated at 1010. Otherwise, if the new Xw angle clears the critical limit test, the program can honor the requested move. The program next tests the requested "wheelie" pitch direction at 1028, and either pitches the front nose down at 1030 or up at 1032, and then updates the Xw angle at 1010. Finally, just as with the X/Y/Z tests of FIG. 7B, the Xw angle limit test at 1010 will likewise catch fatal errors where the conditions change, but the player does nothing—such as the road banking suddenly left during a wheelie, which tips the rider right into a spectacular crash.

Thus, while the technology herein has been described in connection with exemplary illustrative implementations, the invention is not to be limited by the disclosure. For example, although the exemplary illustrative non-limiting implementation is described in connection with a motorcycle, any type of vehicle or other object could be used. The invention is intended to be defined by the claims and to cover all corresponding and equivalent arrangements, whether or not specifically disclosed herein.

We claim:

1. A method for simulating the twist-grip throttle controller of a vehicle comprising:
   with a computing device having a processor and a memory, receiving linear acceleration signals from a handheld controller communicating with the computing device, said linear acceleration signals indicating tilt orientation of said handheld controller with respect to gravity;
   determining, in response to said received linear acceleration signals, the angular orientation of said handheld controller in a twist direction controlled at least in part by wrist rotation; and
   simulating virtual throttle control of a virtual vehicle in response to said determined angular orientation, including controlling, at least in part in response to said determined orientation, a vibration motor within said handheld controller to simulate end of travel of a vehicle twist-grip throttle controller.

2. The method of claim 1 further including determining angular orientation of said handheld controller in response to said sensed linear acceleration in a direction corresponding to a further wrist rotation about the axis of the forearm; and
   simulating lean of a simulated virtual vehicle at least in part in response to said determined further angular orientation.

3. The method of claim 1 wherein said handheld controller simulates a twist-grip controller disposed on simulated motorcycle handlebars.

4. The method of claim 1 wherein said sensed linear acceleration provides three orthogonal axes of sensed linear acceleration.

5. The method of claim 1 further including sensing the distribution of a game player's weight on a platform, and further simulating degree of lean of said virtual vehicle at least in part in response to said sensed weight distribution.

6. The method of claim 1 further including using said sensed linear acceleration to at least in part control the attitude of a vehicle displayed on a display.

7. The method of claim 1 further including controlling a virtual vehicle displayed on a screen to at least partially maneuver in free space at least in part in response to said sensed linear acceleration.

8. The method of claim 1 further including sensing at least some aspect of attitude of said handheld controller using at least one gyro sensor disposed therein, and controlling said virtual vehicle at least in response to said sensing.

9. A system for playing video games based on game software, comprising:
   a handheld controller including therein at least one linear accelerometer and a vibration motor;
   a video game console wirelessly coupled to said handheld controller, said video game console executing game software responsive to said sensed linear acceleration and sending signals via said game console controlling the vibration motor; and
   a non-transitory storage medium operatively coupled to said game console, said storage medium storing instructions that, when executed by the video game console, control the video game console to receive and process said sensed linear acceleration and send commands to activate said vibration motor within said handheld controller, said stored instructions thereby causing said handheld controller to simulate a twist-grip throttle control including end-of-travel characteristics thereof.

\* \* \* \* \*